United States Patent
Scales

(10) Patent No.: US 7,185,327 B2
(45) Date of Patent: Feb. 27, 2007

(54) SYSTEM AND METHOD FOR OPTIMIZING OPERATIONS VIA DATAFLOW ANALYSIS

(75) Inventor: Daniel J. Scales, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 09/757,764

(22) Filed: Jan. 9, 2001

(65) Prior Publication Data

US 2002/0092005 A1 Jul. 11, 2002

(51) Int. Cl.
*G06F 9/45* (2006.01)

(52) U.S. Cl. .................. 717/155; 717/156; 717/161

(58) Field of Classification Search ............... 717/144, 717/155, 156, 159, 160, 161, 152; 714/51; 712/244

See application file for complete search history.

(56) References Cited

U.S. PATENT DOCUMENTS

| | | | | |
|---|---|---|---|---|
| 5,625,835 A | * | 4/1997 | Ebcioglu et al. | 712/244 |
| 5,758,051 A | * | 5/1998 | Moreno et al. | 714/51 |
| 5,787,287 A | * | 7/1998 | Bharadwaj | 717/144 |
| 5,850,552 A | * | 12/1998 | Odani et al. | 717/156 |
| 5,854,933 A | * | 12/1998 | Chang | 717/160 |
| 6,016,398 A | * | 1/2000 | Radigan | 717/152 |
| 6,077,313 A | * | 6/2000 | Ruf | 717/155 |
| 6,128,775 A | * | 10/2000 | Chow et al. | 717/156 |
| 6,151,704 A | * | 11/2000 | Radigan | 717/159 |
| 6,487,716 B1 | * | 11/2002 | Choi et al. | 717/159 |
| 6,516,463 B2 | * | 2/2003 | Babaian et al. | 717/156 |
| 6,615,403 B1 | * | 9/2003 | Muthukumar et al. | 717/160 |
| 6,918,111 B1 | * | 7/2005 | Damron et al. | 717/161 |

* cited by examiner

*Primary Examiner*—Tuan Dam
*Assistant Examiner*—Michael Yigdall

(57) ABSTRACT

A method for modifying serial dependencies in a procedure includes a step of building a graph representation of the procedure. The graph representation has an origin as well as a unique position, relative to the origin, for each memory operation in the procedure. Each memory operation in the representation is designated with a location type. Each of these location types are based on one or more characteristics of the corresponding memory operation that are sufficient to notify the compiler that the memory operation accesses a distinct or disjoint memory location. Memory operations having the same location type as subsequent memory operations are identified. When the graph representation does not include additional memory operations of the same location type between pairs of such memory operations, the subsequent memory operation is moved to a position in the intermediate representation that is closer to the origin.

39 Claims, 11 Drawing Sheets

SYSTEM AND METHOD FOR OPTIMIZING OPERATIONS VIA DATAFLOW ANALYSIS

The present invention relates generally to compilers in computer systems, and particularly to a system and method for optimizing the placement of machine operations in a schedule of machine instructions.

BACKGROUND OF THE INVENTION

The generation of efficient machine code for programs written in modern languages, such as Java™ (Registered Trademark of Sun Microsystems, Inc.) and Modula-3, remains a challenge. This is particularly the case in light of the fact that each incremental increase in the speed of machine code, which implements the programs written in such modern languages, provides enormous commercial advantages in the form of improved web site hosting, data routing and analysis. Thus, the development of improved compilers that generate faster executing machine code remains a commercially desirable objective.

Much work has been done to improve the speed of machine code produced by modern compilers. For example, modern compilers eliminate computationally expensive array bounds checks when the compiler can prove that the index of the array reference is non-negative and less than the length of the array. Computationally expensive method calls are converted to less expensive direct calls when the compiler can prove that there is only one possible target method. Additionally, a new object is allocated in a stack frame rather than on the heap if, among other things, the compiler can show that a reference to the object never escapes to another thread or to a method higher in the stack. Allocating an object in a stack frame introduces less overhead than allocating an object on the heap.

Despite the numerous advances that have been made in modern compiler theory, compilers that generate faster machine code are needed in the art. Compilers that generate faster machine code will reduce reliance on increasingly expensive workstations and permit the creation of more powerful applications. Therefore, techniques for improving the speed of machine code generated by compilers is needed in the art.

SUMMARY OF THE INVENTION

The present invention provides techniques for improving the speed of machine code generated by compilers. A graph representation of a program written in a high level language, such as Java™, is built. A location type is designated for each memory operation in the graph representation. The location type of each memory operation is used to determine the placement of the machine code instructions, corresponding to the memory operations in the graph representation, in a schedule of machine code instructions. This provides the compiler with greater flexibility in scheduling memory operations so that the speed of the resulting machine code is optimized. For example, certain memory operations can be moved earlier in the schedule when the compiler can prove that prior memory operations were of a different location type. Thus, the machine code generated by the methods of the present invention includes highly optimized memory operation scheduling, resulting in faster executing machine code.

One embodiment of the present invention provides a method for modifying serial dependencies in a procedure. A graph representation of the procedure is built. This graph representation has an origin and includes a unique position, relative to the origin, for each memory operation in the procedure. A location type for each memory operation in the representation is designated. Each of these location types is based on a characteristic of the corresponding memory operation. As used herein, a location type is any property that can by used by the compiler as a way of assigning a memory operation to a particular set of memory instructions that are unaffected by memory instructions in other sets of memory instructions. Such sets of memory instructions may be referred to as types.

Memory operations having the same location type can be paired. Each such memory operation pair includes a first memory operation that is closer to the origin than a second memory operation. For a pair of memory operations in which no additional memory operations of the same location type fall between the pair, the second memory operation is moved to a new position in the graph representation that is closer to the first memory operation. In some embodiments of the invention, this moving step results in the second memory operation being advanced in a schedule of machine instructions. In additional embodiments of the invention, the first memory operation is a store or array store and the second memory operation is a load or an array load. In yet other embodiments of the present invention, the location types used to designate each memory operation include data types such as a base type, an array type, and an object type. Data types may serve as location types in strongly typed languages such as Java™.

In some embodiments of the present invention, the step of building the graph representation includes the step of assigning an initial set of serial dependencies between program operations represented in the graph. Furthermore, the step of moving the second memory operation to a new position in the graph representation that is closer to the first memory operation includes removing one or more of the serial dependencies in the initial set of serial dependencies and creating a new serial dependency from the second memory operation to the first memory operation.

In yet other embodiments of the present invention, the graph representation is an intermediate representation. Such embodiments include instances where the intermediate representation is a static single assignment graph embedded in a control flow graph.

In some embodiments of the present invention, the first memory operation is positioned before a repetitive loop in the procedure, and the second memory operation is within the repetitive loop. In such instances, the graphic representation typically includes a phi node that corresponds to a loop back position in the repetitive loop. In these embodiments, the method includes advancing through the repetitive loop in order to determine a location type for each memory operation in the repetitive loop. When a memory operation having the same location type as the first and second memory operation exists in the loop, the new position in the graph representation is chosen such that it is serially dependent upon the phi node. When no memory operation having the same location type as the first and second memory operation exists in the loop, the new position in the graph representation is chosen such that it is not serially dependent on any operation in the loop. In other words, in this situation the second memory operation can be moved outside the loop, thereby improving the execution efficiency of the program.

The present invention further encompasses embodiments in which the first memory operation in the pair of memory operations is in a main routine in the procedure and the second memory operation is in a routine that is called by an operation in the main routine of the procedure. Accordingly, in such embodiments, it is possible for the second memory operation to be moved to a position, below the first memory operation, in the main routine.

In some embodiments of the present invention, the building step comprises building dependencies between operations in the graph representation using serial semantics. In yet other embodiments, additional dependencies are added to the graph representation. For example, in one embodiment, a global store dependency is added to each operation in the procedure that reads a variable from or stores a variable to memory. Then, a schedule of machine instructions is generated in accordance with the graph representation. This schedule of machine instructions is subjected to the additional constraint that each machine instruction in the schedule, that corresponds to an operation that reads or stores a variable to memory, is ordered in accordance with global store dependencies associated with the operation. In an additional example, a first operation in a procedure affects a value of a variable stored in memory and a second operation in the procedure serially follows the first operation. In this example, the building step further comprises adding a global store dependency from the second operation to the first operation.

The schedule of machine instructions is built in accordance with the graph representation. However, this schedule is subject to the constraint that each machine instruction in the schedule of machine instructions corresponding to the second operation is scheduled after the machine instructions corresponding to the first operation.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

A memory operation is a load or store from the general memory in a program. Memory operations are typically required when accessing a global variable, the field of a structure, an object, or an element of an array. Accessing local variables of a procedure may sometimes involve memory operations, but often the compiler keeps local variables in registers.

The present invention is useful for analyzing the dependencies between various memory operations, such as loads and stores. The information derived from such an analysis is useful for optimizing the generated machine code that corresponds to these memory operations because, in many instances, it allows for a relaxation in the rules for scheduling such memory operations. Strongly-typed languages, such as Java™, provide a rich source of memory operation location types. For instance, when the procedure to be compiled is written in Java™, the data type of each operation can serve as a location type. The designation of memory operations in a program as specific location types provides a mechanism for identifying pairs of memory operations in the program that have the same location type. When no memory operations having the same location type fall between the pair of memory operations, it is possible to move the second memory operation in the pair to a point closer to the first memory operation. The ability to move a second memory operation backward in a sequential set of instructions, so that it is closer to a first memory operation, introduces a new form of flexibility in the scheduling of memory operations in a procedure. This is because the system and method of the present invention imposes no requirement that the second memory operation be moved backward. Indeed, the compiler only moves a memory operation backward when such movements will improve the speed of the resulting machine code. Thus, the methods of the present invention provide additional compiler tools for the generation of fast machine code.

To illustrate the utility of the present invention, consider a field O.f that is loaded on every iteration of a repetitive loop. If the compiler can prove that O.f is not being changed during the execution of the repetitive loop, then the load of the field can be executed once above the loop, thus resulting in a significant performance improvement.

Figure 1:
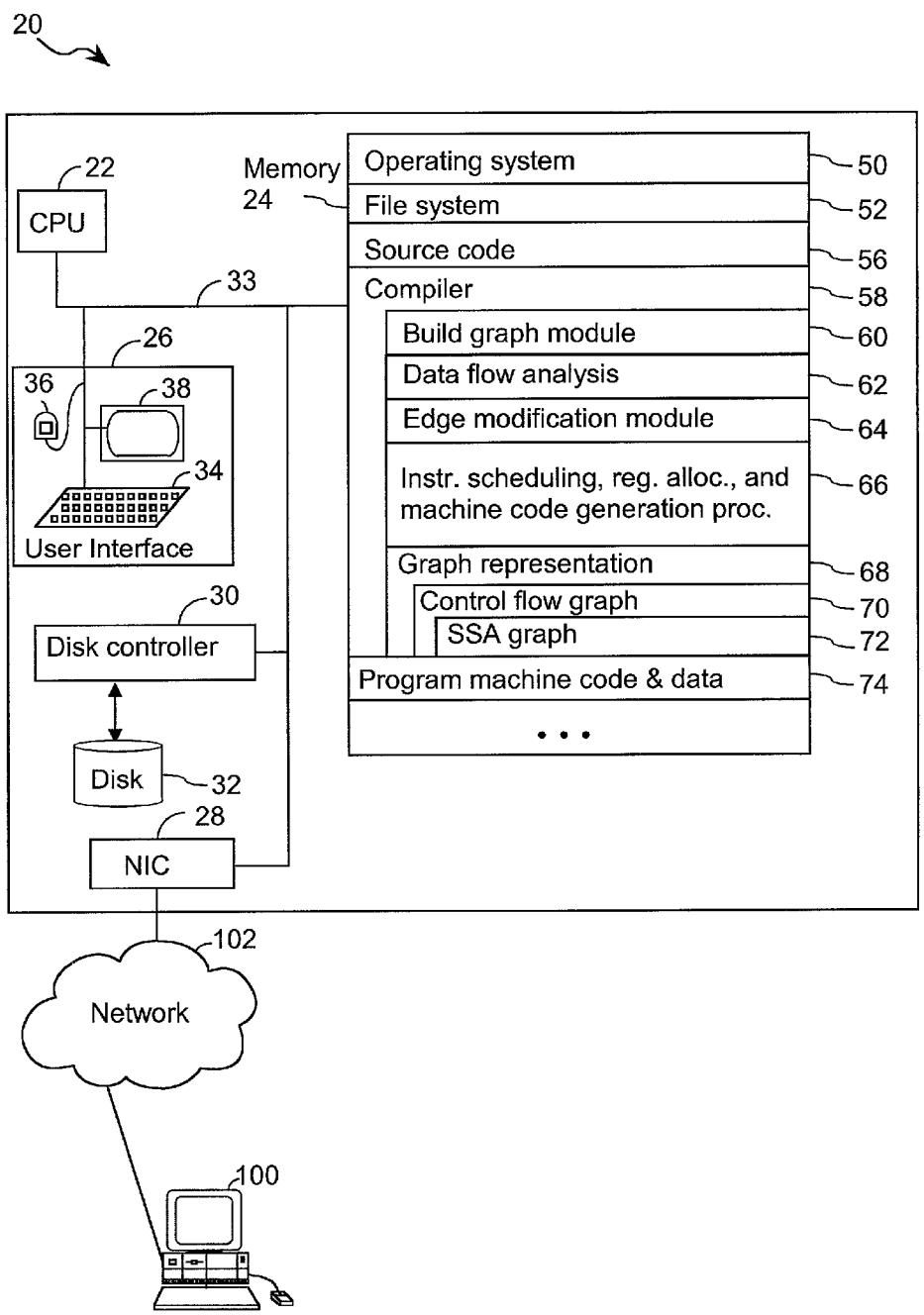
FIG. 1 is a diagram of a computer system in accordance with the present invention.

As shown in FIG. 1, in a computer system 20, a central processing unit (CPU) 22, a memory 24, a user interface 26, a network interface card (NIC) 28, and disk storage system, including a disk controller 30 and disk drive 32, are interconnected by a system bus 33. The user interface 26 includes a keyboard 34, a mouse 36 and a display 38. Memory 24 is any suitable high speed random access memory, such as semiconductor memory. The disk drive 32 may be a magnetic, optical or magneto-optical disk drive.

Memory 24 may store the following procedures and data: an operating system 50 such as UNIX;

a file system 52;

a source code file 56 that includes a procedure; in one embodiment, the source code file 56 is a Java™ bytecode program;

a compiler 58; in one embodiment, the compiler is a Java™ compiler; and program machine code and data 74.

The compiler 58 procedures and data may include:

a build graph module 60 that generates a graph representation 68 of portions of the source code 56. In one embodiment, the graph representation 68 includes a control flow graph (CFG) 70 and a static single assignment (SSA) graph 72;

a data flow analysis module 62 for designating a location type for each memory operation in graph representation 68;

an edge modification module 64 for changing dependencies between operations; and an instruction scheduling, register allocation and machine code generation procedure 66 that generates the machine code.

The programs and modules of FIG. 1 each include one or more instructions. The programs, modules and data stored in the memory 24 may also be stored on disk 32. Furthermore, portions of the programs, modules and data shown in FIG. 1 as being stored in the memory 24 may be stored in the memory 24 while the remaining portions are stored on disk 32.

In some embodiments, computer system 20 is connected to a remote computer 100 via a network 102 and network interface card 28. The remote computer 100 will typically have a similar set of components to those shown in FIG. 1, although the specific circuitry, electronic devices and software used to implement each of these components may differ from one computer to the next. In one embodiment, the compiler 58 of the present invention is downloaded from the remote computer 100 via the network 102.

Figure 2:
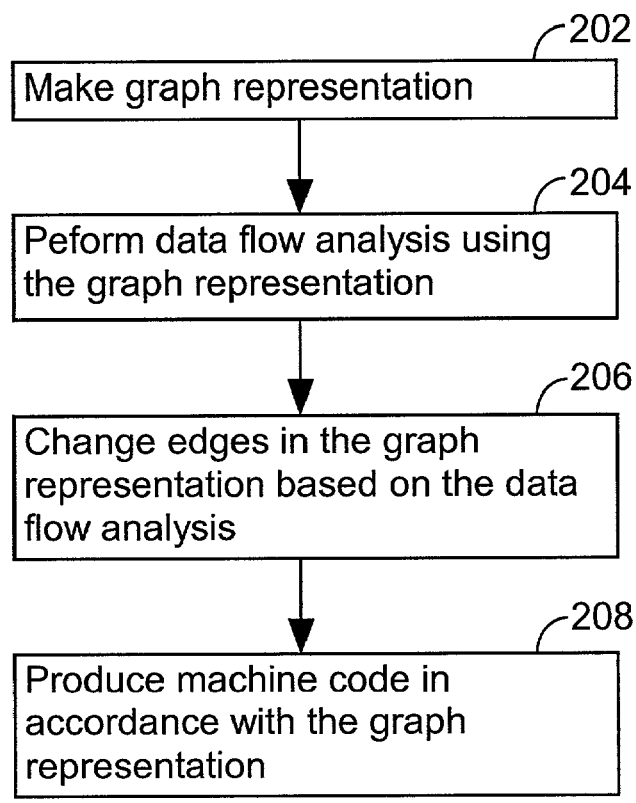
FIG. 2 is a flow chart of exemplary processing steps for a compiler in accordance with one embodiment of the present invention.

The procedures of compiler 58 are generally classified in FIG. 2. In step 202, the compiler makes a graph representation of a source code procedure 56 (FIG. 1). The graph representation includes a number of operations that correspond to programming statements in the source code procedure 56. These operations include, for example, numeric operations such as constant, add, subtract, multiply, memory operations such as get_field and put_field, and control operations such as if and switch. The operations in the graph representation also include operations that correspond only indirectly to programming statements in the source code procedure. For instance, the compiler may insert phi nodes and run-time checks, as well as miscellaneous operations such as NOP and select. In step 204, data flow analysis is performed on the graph representation. This data flow analysis includes techniques such as type propagation, escape analysis, and other traditional data analyses. Additionally, the present invention includes a new form of data flow analysis that designates location types for each memory operation in the graph representation. After data flow analysis 204 is performed, dependencies ("edges") between the operations in the representation are changed 206 based on the data accumulated by data flow analysis 204. Changes 206 have the effect of allowing operations to be moved within the graph representation. Finally, in step 208, compiler 58 produces machine code in accordance with the graph representation, including the dependencies that are present in the graph representation.

Building the Graph Representation

Compiler 58 generates the graph representation 68 from source code 56 (FIG. 1), which in the preferred embodiment is a Java™ bytecode program. In one embodiment, the graph representation is an intermediate representation. This intermediate representation is a static single assignment graph embedded in a control-flow graph. To create the intermediate representation, source code 56 is scanned to determine the number of basic blocks and edges between the basic blocks. A phi node placement algorithm is executed to determine which local variables of the Java™ virtual machine require phi nodes in the basic blocks. The bytecodes of each of the basic blocks are executed via abstract interpretation, starting with the initial state of the local variables upon method entry. The abstract interpretation maintains an association between Java™ virtual machine local variables and static single assignment (SSA) values, determines the appropriate inputs for new values, and builds the SSA graph.

Compiler 58 performs some optimizations while building the SSA graph to reduce the number of nodes. For instance, compiler 58 replaces an array length operation with the allocated size of an array, if the array was allocated in the current method. Compiler 58 also eliminates bounds checks if the index and array length are constant. These optimizations are especially important in methods, such as class initialization methods, that initialize large constant-sized arrays.

Representation of a Method

Figure 3:
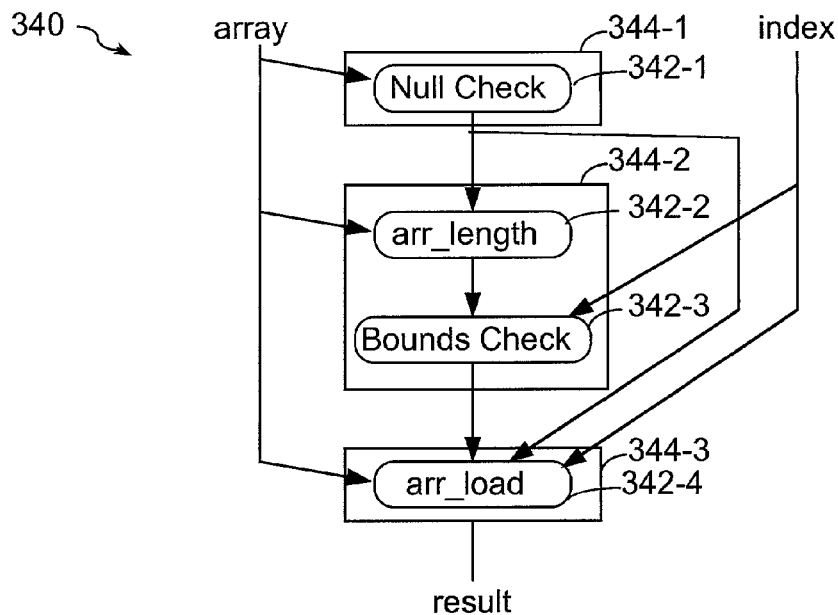
FIG. 3 is a diagram of an exemplary expansion of a Java™ array load instruction into a graph representation of FIG. 1.
Figure 4:
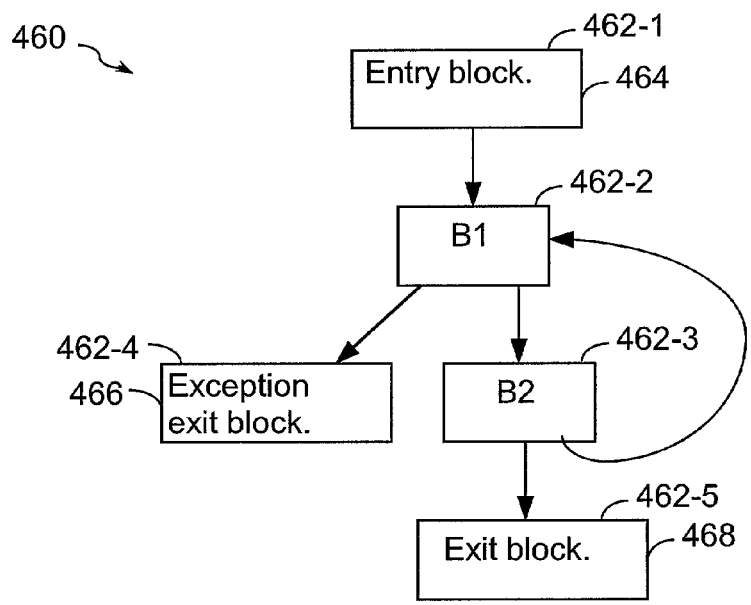
FIG. 4 is a diagram of an exemplary control flow graph of FIG. 1.

Referring to FIG. 3, in an intermediate representation, a method is represented by a static single assignment (SSA) graph 340 embedded in the control flow graph (FIG. 4). The structure of the SSA graph 340 of FIG. 3, the structure of the control flow graph of FIG. 4, and the relationship between the SSA graph and the control flow graph will be described.

The Static Single Assignment Graph

Figure 5:
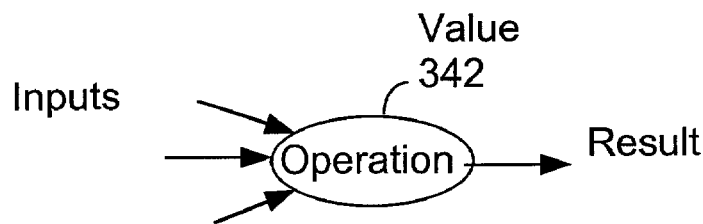
FIG. 5 is diagram of a generalized form for a value.

In FIG. 3, an exemplary static single assignment (SSA) graph 340 for a load operation is shown. The SSA graph 340 has nodes 342-1. 342-2. 342-3 and 342-4, referred to as values, that represent individual operations. Referring also to FIG. 5, a generalized form for a value 342 is shown. The ovals in FIG. 3 represent the nodes or SSA values, and the boxes represent blocks in the control flow graph. A value may have one or more inputs, which are the result of previous operations, and has a single result, which can be used as the input for other values.

Figure 6:
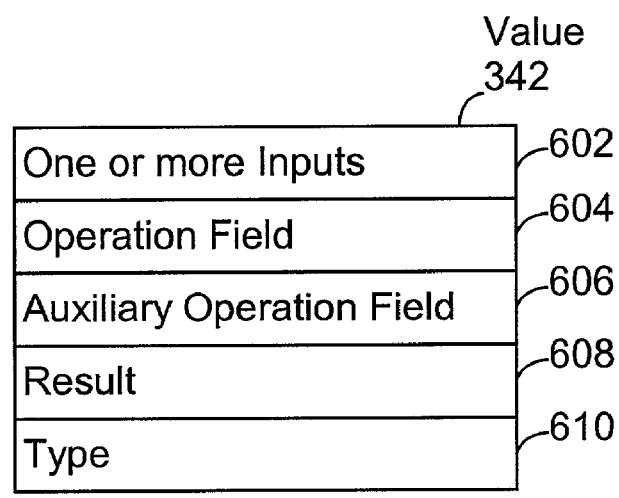
FIG. 6 is a diagram of the components of a value as stored in the SSA graph in the memory.

In FIG. 6, the components of a value 342 are shown as stored in the SSA graph 340 in memory. Each value 342 has one or more inputs 602, an operation field 604, an auxiliary operation field 606, a result 608 and a type 610. The operation field 604 indicates the kind of operation that the value represents. For example, if the operation field 604 is "add," the value 342 represents an operation that adds the two incoming values to produce its result. The auxiliary operation field 606 specifies additional static information about the kind of operation. For example, if the operation field 604 is "new," the value 342 represents an operation that allocates a new object, and the auxiliary field specifies the class of the object to be allocated. If the operation field is "constant," the value 342 represents a numeric or string constant, and the auxiliary field specifies the constant.

The intermediate representation breaks out into separate operations the required run-time checks associated with the programming language, such as Java™, used to implement the method. Compiler 58 has individual operations representing null checks, bounds checks, and other kinds of run-time checks. These operations cause a run-time exception if their associated check fails. A value 342 representing a run-time check produces a result that has no representation in the generated machine code. However other values that depend on the run time check take its result as an input so as to ensure that these values are scheduled after the run-time check. Representing the run-time checks as distinct operations allows compiler 58 to apply optimizations to the checks, such as using common subexpression elimination on two null checks of the same array.

In particular, FIG. 3 shows the expansion of a Java™ array load into the intermediate representation. Array and index are the values that are input to the array load operation. Java™ requires that a null check and a bounds check be performed before an element is loaded from an array. The null check (null_ck) value 342-1 takes the array reference as input, and throws a NullPointerException if the reference is null. The array length (arr_length) value 342-2 takes an array reference and the associated null check value as input, and produces the length of the array. The bounds check (bounds_ck) value 342-3 takes an array length and an array index as inputs. The bounds check value throws an ArrayindexoutOfBounds Exception if the index is not within the bounds of the array. The array load (arr_load) value 342-4 takes an array reference, an index, and the associated null check and bounds check values, and returns the specified element of the array.

The intermediate representation also includes machine-dependent operations that represent or map very closely to specific target machine instructions. One pass of compiler 58 converts many of the machine-independent operations into one or more machine-dependent operations. The conversion to machine-dependent values allows for optimization of the lower-level operations, and allows the instruction scheduling, register allocation, and code generation passes to operate directly on the SSA graph 72 (FIG. 1).

The SSA graph 72 (FIG. 1) is a factored representation of the use-def chains for all variables in a method, since each value explicitly specifies the values used in computing its result. When building the SSA graph 72 (FIG. 1), compiler 58 also builds def-use information and updates the def-use chains when the graph is manipulated. Therefore, an optimization can, at any stage, directly access all the users (i.e., instructions, represented by blocks in the graph) of a particular value.

Representing Control Flow

In FIG. 4 an exemplary control flow graph 460 is shown. Compiler 58 represents a method as an SSA graph embedded within the control flow graph 460. Each value is located in a specific basic block 462 of the control flow graph 460, although various optimizations may move values among blocks 462 or even change the control flow graph 460. A block 462 in the control flow graph 460 may have zero or more incoming edges and zero or more outgoing edges. Some of the outgoing edges may represent the control flow that results from the occurrence of an exception. These edges are labeled with the type of exception that causes flow along that edge.

Each control flow graph 460 has a single entry block 464, a single normal exit block 468, and a single exception exit block 466. The entry block 464 includes the values representing the input arguments of the method. The normal exit block 468 includes the value representing the return operation of the method. The exceptional exit block 466 represents the exit of a method that results when an exception is thrown that is not caught within the current method. Because many operations can cause run-time exceptions in Java™ and these exceptions are not usually caught within the respective method in which the exception occurs, many blocks of the graph may have an exception edge to the exception exit block 466. Blocks B1 and B2, 462-2 and 462-3, respectively, form a loop. Block Bi 462-2 has an exception exit and is connected to the exception exit block 466. Block B2 462-3 is connected to the normal exit block 468.

Compiler 58 uses the standard definition of a basic block. Each block 462 is a basic block. All blocks 462 end when an operation is reached that has two or more control exits. An operation that can cause an exception is therefore always located at the end of a basic block 462.

Many types of values affect the control flow of a program. An "if" node takes a boolean value as input and determines the control flow out of the current block based on that input. A "switch" node determines control flow based on integer input. Exception causing operations include method calls, run-time checks, and object or array allocations. The throw operation explicitly throws an exception.

Each block 462 has a reference to a distinguished value, called the control value. For a block that has more than one outgoing edge, the control value is the value that controls the program flow or that may cause an exception. The control value of the normal exit block 466 is the return value. Simple blocks with a single outgoing edge have no control value. The control value field of a block 462 provides access to the exception-causing or control-flow value of the block. In addition, the set of control values indicates the base set of values in a method that are "live," because those values are used in computing the return value and for controlling program flow. Other live values are determined recursively based on the input of this base set.

Compiler 58 performs dead code elimination of values that are no longer needed in accordance with the "live" values as indicated by the set of control values.

All values that are the control value of a block cannot be moved from their block, and are referred to as "pinned." Phi nodes are pinned; and operations that write to the global heap are pinned. All other operations are not pinned, and may be moved freely among blocks (i.e., to a different position within the control flow graph), as long as their data dependencies are respected.

The Type System

As shown in FIG. 6, every value in the SSA graph has a type 610. In one implementation, the type system represents all of the location types present in a Java™ program.

These data types include base types, such as integer, short integer, double integer, single precision floating point, double precision floating point, and object handles (also called object references or object instances), as well as array types (arrays of integers, long integers, short integers, single precision floating point, double precision floating point, object handles, booleans, bytes, and unicode characters).

Each distinct object handle, referring to an instance of distinct object class, is considered to be a distinct object type.

In the present invention, the set of data types used by the compiler for purposes of determining scheduling dependencies between basic blocks may include data types if the program to be compiled is written in a strongly-type language such as Java™. More generally, however, the set of location types used by the compiler involve any set of assumptions that the compiler can make. Thus, in some instances a location type includes unique object fields. Each unique object field, that is a field of an instance of a particular object class, is considered to be a distinct location type. The location type of a memory operation involving an object field x.a is "field x.a." When a program includes two memory operations, one referencing field x.a and the other field x.b, these two memory operations are assigned distinct location types even when fields x.a and x.b both have the same base data type (e.g., integer).

The type of each value is determined as the compiler builds the SSA graph from the method's bytecodes. The bytecodes for a method do not always have sufficient information to recover the exact types of the original Java™ program. However, it is possible to assign a consistent set of types to the values such that the effects of the method represented by the SSA graph are the same as the original method. Although Java™ does not make use of an explicit boolean type, the compiler assigns a type of boolean to a value when appropriate. The boolean type indicates an integer value that can only be equal to zero or one, and enables certain optimizations that do not apply to integers in general.

For some operations, the value's type further specifies the operation and therefore affects the specific machine code generated. For example, the generic add operation can specify an integer, long or floating point addition, depending on its result type. Information about a value's type can also help optimize an operation that uses that value. For example, the compiler may be able to resolve the target of a virtual method call if the compiler has more specific information about the type of the method call's receiver.

The type system includes additional information that facilitates optimizations. The compiler allows specification of the following additional properties about a value with a particular Java™ type T:
1. the value is known to be an object of exactly class T, not a subclass of T;
2. the value is an array with a particular constant size; and
3. the value is non-null.

By incorporating these properties into the type system, the compiler can describe properties of any value in the SSA graph by its type. In addition, the compiler indicates properties for different levels of recursive types, such as arrays. In an alternate embodiment, the type system also includes union types, which specify, for example, that a particular value has either type A or type B, but no other type. It will be appreciated by one skilled in the art that many other additional type systems may be defined and all such type systems are included within the scope of the present invention.

Global Stores

Figure 7:
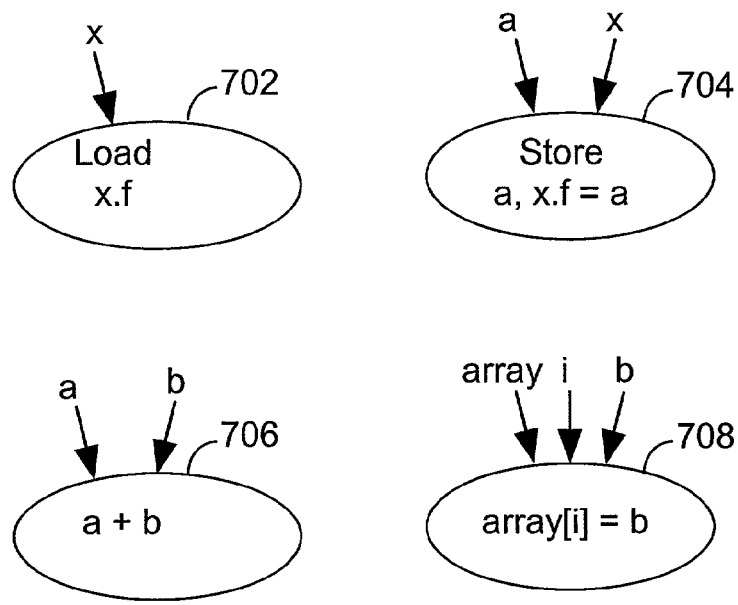
FIG. 7 is a diagram of exemplary operations that may be used in a graph representation of a procedure, in accordance with one embodiment of the present invention.

In FIG. 7, there are four illustrative operations that are used in intermediate representations of a method (i.e., a computer program or procedure). Arrows to each operation represent the inputs (also termed dependencies or edges), inherent to each operation. Thus, load x.f (702) takes as input value x, store a; x.f=a (704) takes as input value a as well as the value x. Operation a+b (706) takes the values a and b as input. Finally, the operation store array[i]=b 708 takes as input array, index i, and variable b.

Memory operations such as loads and stores are also represented by nodes similar to those described in FIG. 7. For example, referring to FIG. 8, a load 802 of a field f of an object x is represented as an operation that takes a reference to the object x as input and produces a value of the appropriate type, i.e. the type of field x.f, as output. Similarly, a store 804 into an array is represented as an operation that takes a reference to the array, an array index i, and a value a to store in the array, and doesn't produce an output.

In general, compiler 58 must ensure that the original ordering among memory operations is maintained, even when the memory operations are not directly connected in the standard SSA graph. For example, a store operation may store into a field that is read by a later load operation, where the SSA graph includes one or more other operations between the store operation and the load operation. From the viewpoint of the SSA graph, the store operation does not produce any output value, and thus it does not produce an output value that is used by the subsequent load operation. Consequently, there is no direct scheduling dependence between the two operations. However, in order to maintain the original program semantics, compiler 58 must ensure that the store is executed before the load.

Figure 8:
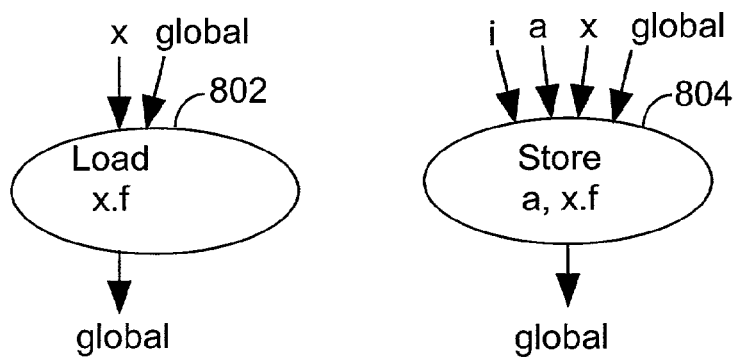
FIG. 8 is a diagram of exemplary memory operations that are used in a graph representation in accordance with one embodiment of the present invention.

The problem of scheduling dependencies between successive memory operations is solved by having store operations produce a value termed a "global store." In this solution, the global store represents the current contents of global memory. Since a store operation modifies the contents of memory, it takes the latest "global store" as an extra input and produces a new "global store." Additionally, each load operation takes the latest "global store" as an extra input. These connections between memory operations now correctly represent the ordering constraints between loads and stores, and therefore these connections in the SSA graph ensure that memory operations are scheduled properly by the scheduling algorithm described above for SSA graphs. The introduction of a global store is illustrated in FIG. 8. As shown in FIG. 8, load 802 has a global store as input while store 804 has a global store as input and output. In some embodiments, the use of a global store is extended to other types of programming operations. For example, procedure calls having programming operations that write to memory are assigned a global store as an extra input and produce a global store as output. This use of global stores has the effect of maintaining the proper order for procedures calls that write to memory.

Analyzing and Summarizing Effects of Memory Operations

Figure 9A:
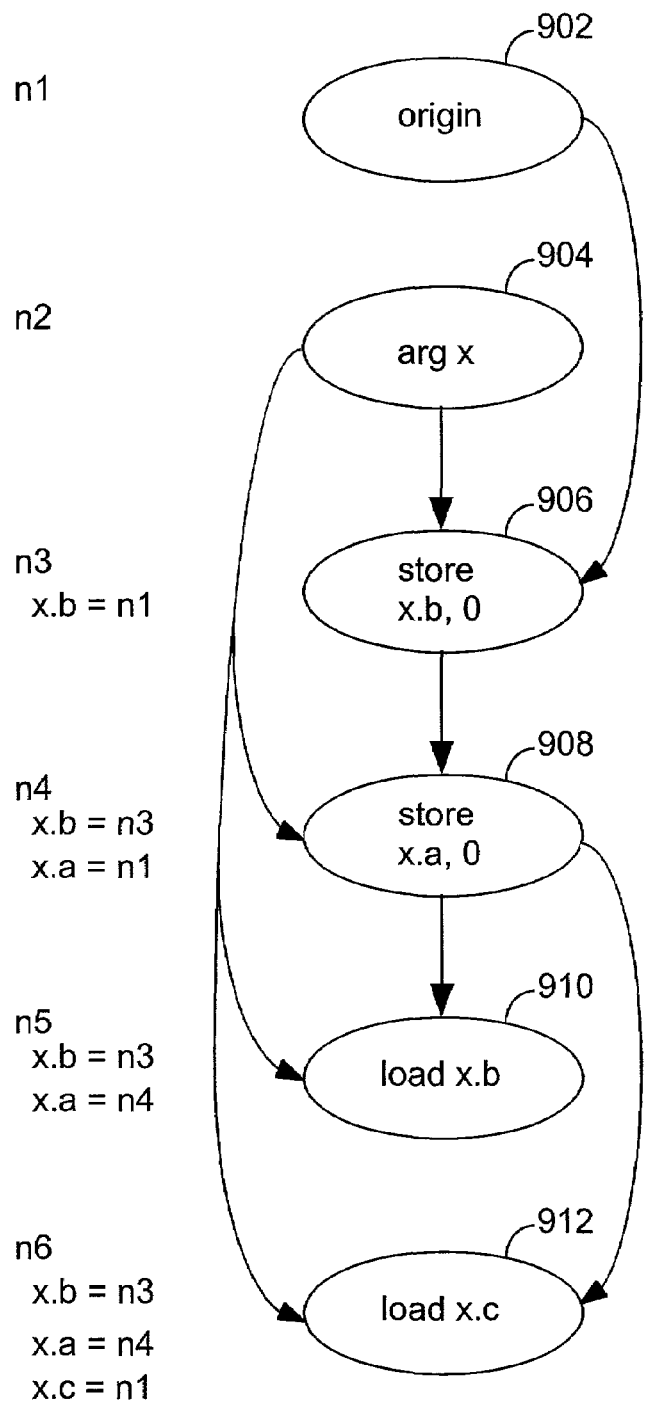
FIG. 9A illustrates a graph representation for exemplary code with dependencies between memory operations drawn in accordance with serial semantics.

In the figures that accompany this section, control-flow is present implicitly unless specifically described. In the present invention, memory operations such as stores and procedure calls generate a global store. These global stores, in turn, are used by compiler 58 to order successive operations that read or write to memory. For example, consider the following exemplary programming statements in a function F(x):
(1) x.b=0;
(2) x.a=0;
(3) y=x.b;
(4) z=x.c;

An intermediate representation that corresponds to these programming statements is found in FIG. 9A. The intermediate representation in FIG. 9A includes an origin 902 that marks the entry into the intermediate representation. In FIG. 9A, arg x (904) represents the argument x to function f(x), store x.b, 0 (906) corresponds to programming statement 1, store x.a, 0 (908) corresponds to programming statement 2, and so forth. Because of the use of global stores to memory operations, as illustrated in FIG. 8, the intermediate representation of FIG. 9A includes a dependency or edge between each operation and one or two of its neighbors.

The intermediate representation in FIG. 9 include loads (910, 912) and stores (906, 908). It is possible to designate a location type for each of these memory operations based on an individual characteristic of each memory operations. For example, when the intermediate representation corresponds to a program written in a strongly typed language such as Java™, the location type for each of these memory operations could be the data type that is loaded or stored. Representative data types include base types, such as integer, short, and double, as well as array types, object types, and field types. However, any assumption that can safely be made about a particular load or store can serve as a location type. Thus, as used herein, a location type is any property that can by used by the compiler as a way of assigning a memory operation to a particular set of memory instructions that are unaffected by memory instructions in other sets of memory instructions. Such sets of memory instructions may be referred to as types. Thus, for example, if memory instruction A has property alpha, and it is guaranteed that memory instructions with property alpha do not affect memory instructions having property beta, than two useful sets, for characterization purposes, are the set of memory instructions having property alpha and the set of memory instructions having property beta.

Based upon the assignment of a location type for each load and store in the intermediate representation, one can determine the last operation that affected the same location type. To illustrate this assignment system, each operation in FIG. 9A is labeled with a node number. For each node, the compiler generates a "summary" indicating the most recent memory operation to affect each location type used in the procedure represented by the graph.

Store x.b, 0 (906) at node n3, represents a memory operation in which the integer "0" is stored in memory location x.b. That is, at node n3 a variable (i.e., a datum in memory) of location type x.b is updated by a store operation. The graph contains no memory store operations prior to node n3 in the graph for location type x.b. Therefore, the location type summary for node n3 is "x.b=n1." In other words, when there is no known memory store operation for a particular location type, its most recent memory operation for that location type is assigned to the entry point node (n1).

Node n4, store 908, represents a memory operation in which object field x.a is assigned a new value. There is no earlier node in the graph at which a variable of location type x.a is updated. Therefore the location type summary for x.a at node n4 is "x.a=n1."

When analyzing the next node, n5, it is determined that node n3 is a store to a variable of location type x.b and that node n4 is a store to a variable of location type x.a. As a result, the summary for node n5 is "x.b=n3; x.a=n4." In general, the summary for any node lists all the location types used in the procedure, via any and all control paths, and for each such location type lists the closest preceding node which may have modified the value of any variable (i.e., datum in memory) of that location type.

The book keeping process used in FIG. 9A continues with an examination of node n6 (912). Node n6 is a memory operation that loads a variable of location type x.c. The memory dependency summary for node n6 includes a summary for location types x.a, x.b, and x.c. The most recent node to update a variable of data type x.a is store 908, and thus x.a is denoted as n4 because the most recent node (also called the closest previous node) to update a memory location type of x.a is node n4. The most recent node to update a variable of location type x.b is store 906, and thus x.b is denoted as n3. The most recent node to update a variable of location type x.c is a position in the graph that precedes the entry point (n1), and thus x.c is denoted at n1. This book keeping process is performed for each node in the intermediate representation until the terminal node is reached.

Figure 9B:
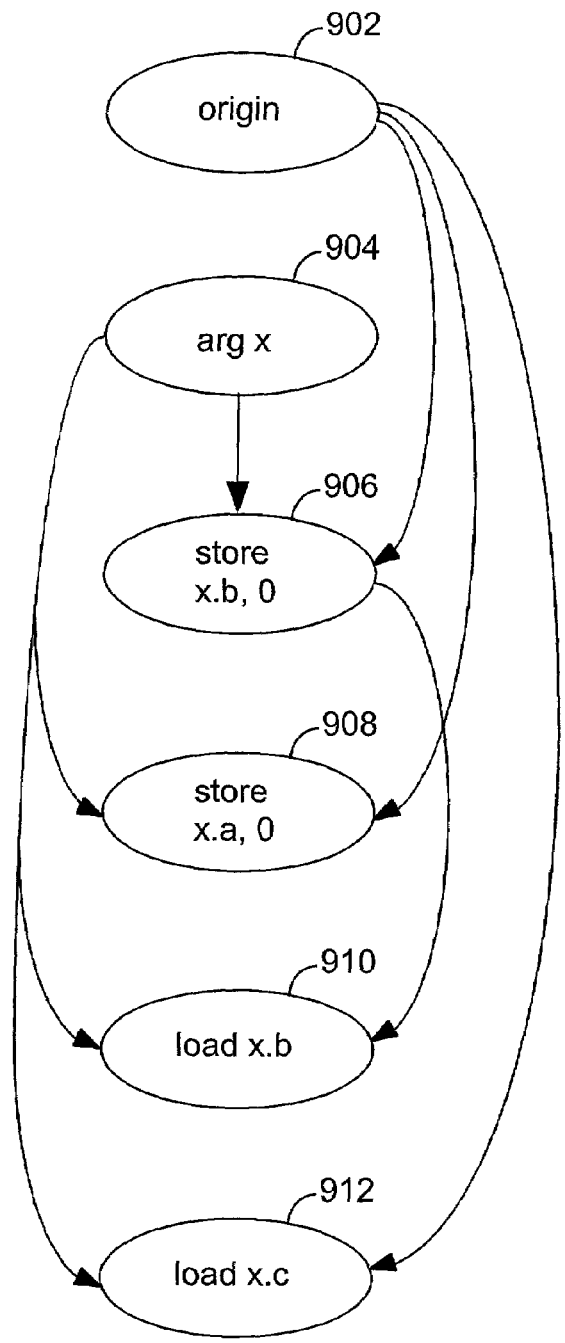
FIG. 9B illustrates the graph representation of FIG. 9A in which memory operations have been moved in accordance with one embodiment of the present invention.

In FIG. 9B, the information derived from FIG. 9A is used to move the dependencies of operations 908, 910, and 912. Thus, rather than depending on 906, operation 908 depends on origin n1 (902) because n1 is the first memory operation to be characterized by location type x.a. Similarly, an edge to 910 is drawn from n3 (906) rather than n4 (908) because 906 is the last memory operation before 910 that is characterized by data type x.b. Finally, an edge is drawn between n1 (902) and n6 (912) rather than between n4 (908) and n6 (912) because no memory operation after origin n1 is characterized by location type x.c. The movement of edges drawn to 908, 910, and 912 in FIG. 9B, to memory operations that are at, or closer to the origin then the corresponding memory operations in FIG. 9A presents a powerful resource. For example, compiler 58 is now free to place the machine instructions that correspond to 912 at any point in a schedule of machine instructions after the machine instructions that correspond to 904 as long as the compiler respects all other dependencies as well. This is advantageous because the compiler can schedule these operations in such a manner that it is optimized for speed performance on the exact hardware that is used to execute the machine instructions. Thus, the intermediate representation of FIG. 9B provides compiler 58 with more freedom to optimize the placement of machine instructions in a schedule of machine instructions than the intermediate representation of FIG. 9A.

Figure 10A:
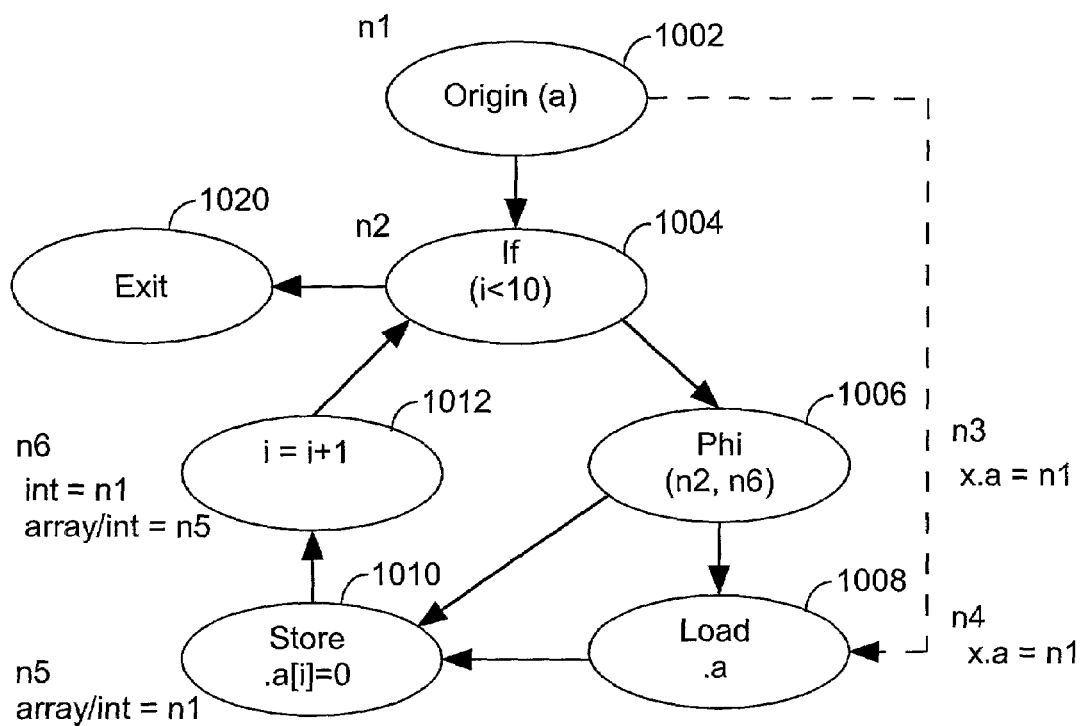
FIG. 10A illustrates a graph representation of an exemplary procedure that has a repetitive loop, in accordance with one embodiment of the present invention.
Figure 10B:
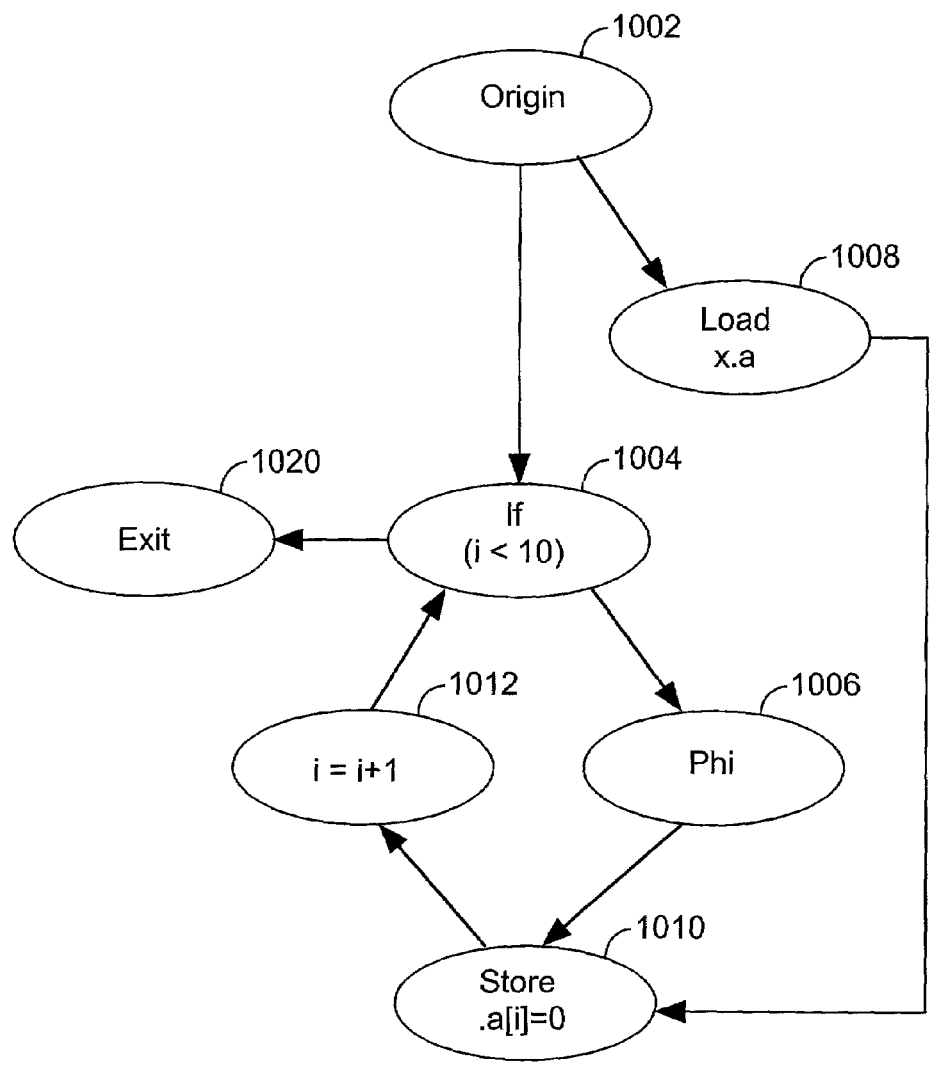
FIG. 10B illustrates the graph representation of FIG. 10A, after a memory operation has been moved out of the repetitive loop because no other memory operation in the loop is characterized by the same location type.

Referring to FIG. 10A, additional benefits of the present invention are described. In FIG. 10A, phi node 1006 marks an entry into the repetitive loop formed by operations 1004 thru 1012. Upon advancement through the repetitive loop, in order to designate a location type for each memory operation in the repetitive loop, it is noted that no other memory operation besides load 1008 is characterized by the location type "field x.a." Therefore, it is possible to remove the edge from 1006 to 1008 and replace it with an edge from 1002 to 1008. A dashed arrow from 1002 to 1008 represents this new potential edge. Upon the removal of the edge, or dependency, from 1006 to 1008, compiler 58 can move load 1008 out of the repetitive loop, as shown in FIG. 10B. The intermediate representation of FIG. 10B will yield much more efficient machine code than FIG. 10A because load 1008 is executed only once in FIG. 10B rather than on a repetitive basis as in FIG. 10A.

FIG. 10 represents a case where a memory operation is removed from a loop. Similar performance gains can be achieved in other situations. For example, the methods of the present invention can be used to identify memory operations in called procedures that are not dependent on any other operation within the called procedure. In such instances, the memory operation can be removed from the called procedure and placed in the calling procedure.

Figure 11A:
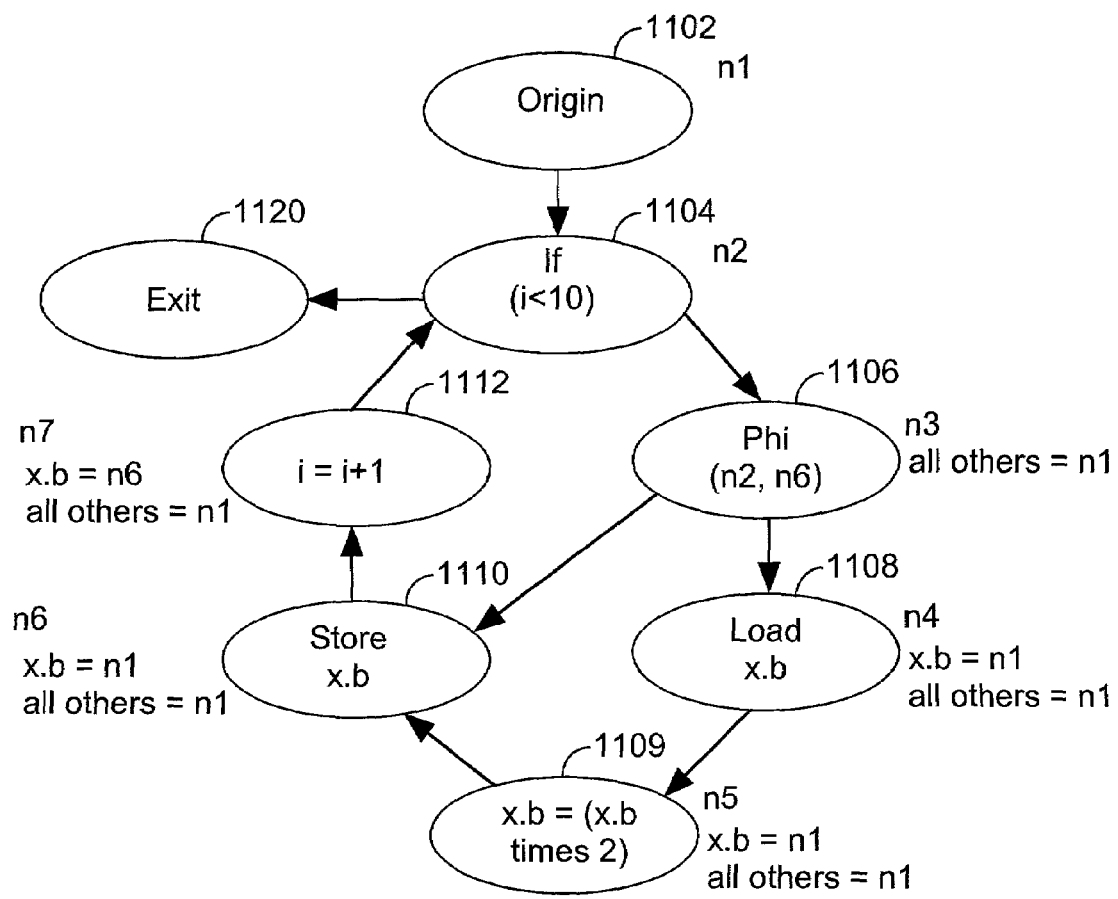
FIG. 11A illustrates a graph representation of another exemplary procedure that has a repetitive loop.

In FIG. 11A, an intermediate representation that includes another repetitive loop is shown. As shown in FIG. 11A, the memory dependency summary for every node of the graph includes an implicit entry of "all others=n1," where "all others" means "all location types other than those explicitly listed in the memory dependency summary," and n1 is the entry point node in this example. Initially, as the compiler traces through the SSA graph, the only entry for each summary is "all others=n1" until a memory store node is encountered that updates a variable of a particular location type. FIG. 11A shows the initial summaries generated when the compiler has reached each node of the graph just once, and not gone around the loop (n2-n7) a second time.

Figure 11B:
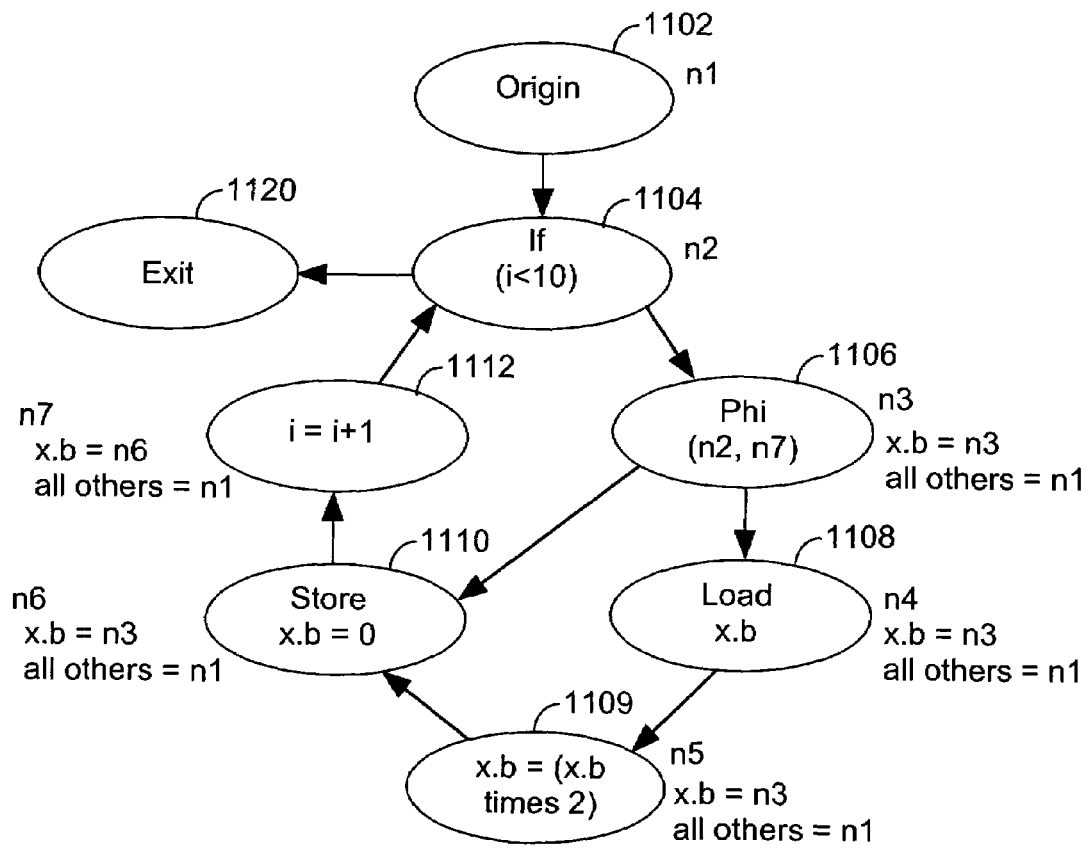
FIG. 11B illustrates the graph representation of FIG. 11A, after the repetitive loop has been advanced through, in order to determine a location type for each memory operation in the repetitive loop.

Thus, FIG. 11A represents a first pass at identifying the most recent memory operations to affect each memory locations of each location type. It will be appreciated that, although each node in the intermediate representation has been examined in the first pass, the intermediate representation must be reexamined to propagate the downstream effects of the location type characterization of each memory operation within the repetitive loop. The results of this reexamination are shown in FIG. 11B.

In this regard, it is noted that node n6 is the only node in the loop that performs a memory store operation, and the effect of this memory operation are propagated to phi node 1106. More particularly, referring to FIG. 11B, when the compiler goes around the loop a second time, the memory dependency summary for the phi node 1106 is updated to indicate itself, node n3, as being the node in which each location type updated anywhere in the loop as being the most recent node at which each such location type was updated. FIG. 11B shows the resulting memory dependency summaries for the nodes in the loop. For instance, the summary at nodes n3, n4, n5, and n6 is "x.b=n3; all others=n1."

After generating the memory dependency summaries, when the compiler considers the scheduling of node n4 (load 1108), it will see that this node has a memory dependency on node n3, the phi node, which is within the loop, and therefore node n4 (load 1108) cannot be moved outside the repetitive loop.

Generally, whenever the SSA graph for a program includes one or more loops, the compiler performs a data flow analysis to determine the memory dependency summaries of the nodes of the graph. Whenever the summary of a node is updated, all the nodes downstream of that node are put on a list of nodes whose summaries are to be updated. The process of updating node summaries continues until there are no nodes left on the list of nodes to be updated. In many cases, the nodes in a loop will be visited just twice; however, when a graph contains nested loops or other more complicated graph structures, some nodes may need to be visited more than two times before the memory dependency summary generation process is completed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for modifying serial dependencies in a procedure, said method comprising:
    building a graph representation of said procedure, said graph representation having an origin and including a unique position, relative to said origin, for each memory operation in said procedure;
    designating a location type for each memory operation in said graph representation; each said location type based on a characteristic of said corresponding memory operation;
    generating a summary for each memory operation in the graph representation that indicates for each location type used in the procedure the closest preceding memory operation to affect that location type;
    identifying a first memory operation having the same location type as a second memory operation; wherein said first memory operation is positioned closer to said origin than said second memory operation, and said graph representation does not include any additional memory operations of the same location type between the first and second memory operations; and
    moving said second memory operation to a new position in said graph representation that is closer to said first memory operation, wherein the moving step includes (i) removing one or more of the serial dependencies in an initial set of serial dependencies that is associated with said second memory operation and (ii) creating a new serial dependency between said first memory operation and said second memory operation.

2. The method of claim 1 wherein
    the building step includes the step of assigning an initial set of serial dependencies between program operations represented in said graph representation.

3. The method of claim 1 wherein said graph representation is an intermediate representation.

4. The method of claim 3 wherein said intermediate representation is a static single assignment graph embedded in a control flow graph.

5. The method of claim 1 wherein said moving step results in said second memory operation being advanced in a schedule of machine instructions.

6. The method of claim 1 wherein said first memory operation is positioned before a repetitive loop in said procedure and said second memory operation is within said repetitive loop; said graphic representation including a phi node that corresponds to a loop back position in said repetitive loop;
    said designating step further comprising a step of advancing through said repetitive loop in order to determine a location type for each memory operation in said repetitive loop;
    wherein
    when a memory operation having the same location type as said first and second memory operation exists in said loop, said new position in said graph representation is a position that is serially dependent upon said phi node; and
    when a memory operation having the same location type as said first and second memory operation does not exist in said loop, said new position in said graph representation is a position that is not serially dependent on any operation in the loop.

7. The method of claim 1 wherein said first memory operation is a store or an array store and said second memory operation is a load or an array load.

8. The method of claim 1 wherein said procedure includes a calling procedure and said first memory operation is in said calling procedure and said second memory operation is in a called procedure that is called by an operation in said calling procedure.

9. The method of claim 8 wherein said moving step results in a placement of said second memory operation in said calling procedure.

10. The method of claim 1 wherein said location type of each memory operation is selected from the group consisting of a predefined set of base types, a predefined set of array types, object types, and object field types.

11. The method of claim 1 wherein the building step further comprises adding a global store dependency to each operation in said procedure that reads a variable from or stores a variable to memory; the method further comprising:
generating a schedule of machine instructions in accordance with said graph representation, wherein each said machine instruction in said schedule of machine instructions, which corresponds to an operation that reads a variable from or stores a variable to memory, is ordered in accordance with said global store dependency associated with said operation.

12. The method of claim 1 wherein a first operation affects a value of a variable stored in memory and a second operation serially follows said first operation, said building step further comprising adding a global store dependency from said second operation to said first operation; the method further comprising:
generating a schedule of machine instructions in accordance with said graph representation, wherein said machine instructions in said schedule of machine instructions corresponding to said second operation are scheduled after said machine instructions corresponding to said first operation.

13. A computer program product for use in conjunction with a computer system, the computer program product capable of modifying serial dependencies in a procedure, the computer program product comprising a computer readable storage medium and a computer program mechanism embedded therein, comprising:
instructions for building a graph representation of said procedure, said graph representation having an origin and including a unique position, relative to said origin, for each memory operation in said procedure;
instructions for designating a location type for each memory operation in said graph representation; each said location type based on a characteristic of said corresponding memory operation;
instructions for generating a summary for each memory operation in the graph representation that indicates for each location type used in the procedure the closest preceding memory operation to affect that location type;
instructions for identifying a first memory operation having the same location type as a second memory operation; wherein said first memory operation is positioned closer to said origin than said second memory operation, and said graph representation does not include any additional memory operations of the same location type between said first and second memory operations; and
instructions for moving the second memory operation to a new position in said graph representation that is closer to said first memory operation, wherein the instructions for moving include (i) instructions for removing one or more of the serial dependencies in an initial set of serial dependencies that is associated with said second memory operation and (ii) creating a new serial dependency between said first memory operation and said second memory operation.

14. The computer program product of claim 13 wherein:
the instructions for building include instructions for assigning an initial set of serial dependencies between program operations represented in the graph.

15. The computer program product of claim 13 wherein said graph representation is an intermediate representation.

16. The computer program product of claim 15 wherein said intermediate representation is a static single assignment graph embedded in a control flow graph.

17. The computer program product of claim 13 wherein said moving step results in said second memory operation being advanced in a schedule of machine instructions.

18. The computer program product of claim 13 wherein said first memory operation is positioned before a repetitive loop in said procedure and said second memory operation is within said repetitive loop; said graphic representation including a phi node that corresponds to a loop back position in said repetitive loop;
said instructions for designating further comprising instructions for advancing through said repetitive loop in order to determine a location type for each memory operation in said repetitive loop; wherein
when a memory operation having the same location type as said first and second memory operation exists in said loop, said new position in said graph representation is a position that is serially dependent upon said phi node; and
when a memory operation having the same location type as said first and second memory operation does not exist in said loop, said new position in said graph representation is a position that is not serially dependent on any operation in the loop.

19. The computer program product of claim 13 wherein said first memory operation is a store or an array store and said second memory operation is a load or an array load.

20. The computer program product of claim 13 wherein said procedure includes a calling procedure and said first memory operation is in said calling procedure and said second memory operation is in a called procedure that is called by an operation in said calling procedure.

21. The computer program product of claim 20 wherein said moving step results in a placement of said second memory operation in said calling procedure.

22. The computer program product of claim 13 wherein said location type of each memory operation is selected from the group consisting of a predefined set of base types, a predefined set of array types, object types, and object field types.

23. The computer program product of claim 13 wherein the building step further comprises adding a global store dependency to each operation in said procedure that reads a variable from or stores a variable to memory; the computer program mechanism further comprising:
instructions for generating a schedule of machine instructions in accordance with said graph representation, wherein each said machine instruction in said schedule of machine instructions, which corresponds to an operation that reads a variable from or stores a variable to memory, is ordered in accordance with said global store dependency associated with said operation.

24. The computer program product of claim 13 wherein a first operation affects a value of a variable stored in memory and a second operation serially follows said first operation, said building step further comprising adding a global store dependency from said second operation to said first operation; the computer program mechanism further comprising:
instructions for generating a schedule of machine instructions in accordance with said graph representation, wherein said machine instructions in said schedule of machine instructions corresponding to said second operation are scheduled after said machine instructions corresponding to said first operation.

25. A computer system for modifying serial dependencies in a procedure, comprising:
a memory to store instructions and data;
a processor to execute the instructions stored in the memory;
the memory storing:
instructions for building a graph representation of said procedure, said graph representation having an origin and including a unique position, relative to said origin, for each memory operation in said procedure;
instructions for designating a location type for each memory operation in said representation; each said location type based on a characteristic of said corresponding memory operation;
instructions for generating a summary for each memory operation in the graph representation that indicates for each location type used in the procedure the closest preceding memory operation to affect that location type;
instructions for identifying a first memory operation having the same location type as a second memory operation; wherein said first memory operation is positioned closer to said origin than said second memory operation, and said graph representation does not include any additional memory operations of the same location type between the first and second memory operations; and
instructions for moving said second memory operation to a new position in said graph representation that is closer to said first memory operation, wherein the instructions for moving include instructions for removing one or more of the serial dependencies in an initial set of serial dependencies and creating a new serial dependency from the first memory operation to the second memory operation.

26. The computer system of claim 25 wherein:
the instructions for building include instructions for assigning an initial set of serial dependencies between program operations represented in the graph.

27. The computer system of claim 25 wherein said graph representation is an intermediate representation.

28. The computer system of claim 27 wherein said intermediate representation is a static single assignment graph embedded in a control flow graph.

29. The computer system of claim 25 wherein said instructions for moving results in said second memory operation being advanced in a schedule of machine instructions.

30. The computer system of claim 25 wherein said first memory operation is positioned before a repetitive loop in said procedure and said second memory operation is within said repetitive loop; said graphic representation including a phi node that corresponds to a loop back position in said repetitive loop;
said instructions for designating further comprising instructions for advancing through said repetitive loop in order to determine a location type for each memory operation in said repetitive loop; wherein
when a memory operation having the same location type as said first and second memory operation exists in said loop, said new position in said graph representation is a position that is serially dependent upon said phi node; and when a memory operation having the same location type as said first and second memory operation does not exist in said loop, said new position in said graph representation is a position that is not serially dependent on any operation in the loop.

31. The computer system of claim 25 wherein said first memory operation is a store or an array store and said second memory operation is a load or an array load.

32. The computer system of claim 25 wherein said procedure includes a calling procedure and said first memory operation is in said calling procedure and said second memory operation is in a called procedure that is called by an operation in said calling procedure.

33. The computer system of claim 25 wherein said instructions for moving results in a placement of said second memory operation in said calling procedure.

34. The computer system of claim 25 wherein said location type of each memory operation is selected from the group consisting of a predefined set of base types, a predefined set of array types, object types, and object field types.

35. The computer system of claim 25 wherein the instructions for building further comprises adding a global store dependency to each operation in said procedure that reads a variable from or stores a variable to memory; the memory further storing:
instructions for generating a schedule of machine instructions in accordance with said graph representation, wherein each said machine instruction in said schedule of machine instructions, which corresponds to an operation that reads a variable from or stores a variable to memory, is ordered in accordance with said global store dependency associated with said operation.

36. The computer system of claim 25 wherein a first operation affects a value of a variable stored in memory and a second operation serially follows said first operation, said building step further comprising adding a global store dependency from said second operation to said first operation; the memory further storing:
instructions for generating a schedule of machine instructions in accordance with said graph representation, wherein said machine instructions in said schedule of machine instructions corresponding to said second operation are scheduled after said machine instructions corresponding to said first operation.

37. The method of claim 1 wherein when no known preceding memory operation in the procedure affects a location type, said summary indicates the origin for that location type.

38. The computer program product of claim 13 wherein when no known preceding memory operation in the procedure affects a location type, said summary indicates the origin for that location type.

39. The computer system of claim 25 wherein when no known preceding memory operation in the procedure affects a location type, said summary indicates the origin for that location type.

* * * * *

UNITED STATES PATENT AND TRADEMARK OFFICE
CERTIFICATE OF CORRECTION

PATENT NO.       : 7,185,327 B2
APPLICATION NO.  : 09/757764
DATED            : February 27, 2007
INVENTOR(S)      : Daniel J. Scales It is certified that error appears in the above-identified patent and that said Letters Patent is hereby corrected as shown below:

In column 7, lines 29-33, delete "Exception if the…..element of the array." and insert the same on line 28 after "ArrayindexoutOfBounds".

In column 8, line 15, delete "Bi 462-2" and insert -- B1 462-2 --, therefor.

Signed and Sealed this

Thirteenth Day of January, 2009

JON W. DUDAS
*Director of the United States Patent and Trademark Office*